United States Patent
Bennett et al.

(10) Patent No.: US 10,627,558 B2
(45) Date of Patent: Apr. 21, 2020

(54) COATING FOR LIGHT-DIFFUSING OPTICAL FIBERS

(71) Applicant: CORNING INCORPORATED, Corning, NY (US)

(72) Inventors: Kevin Wallace Bennett, Hammondsport, NY (US); Trista Nicole Hesch, Campbell, NY (US); Stephan Lvovich Logunov, Corning, NY (US); Manuela Ocampo, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 112 days.

(21) Appl. No.: 15/358,232

(22) Filed: Nov. 22, 2016

(65) Prior Publication Data

US 2017/0146715 A1 May 25, 2017

Related U.S. Application Data (60) Provisional application No. 62/259,773, filed on Nov. 25, 2015.

(51) Int. Cl.
*F21V 8/00* (2006.01)
*G02B 6/036* (2006.01)

(52) U.S. Cl.
CPC .......... *G02B 6/001* (2013.01); *G02B 6/03694* (2013.01)

(58) Field of Classification Search
CPC .................... G02B 6/001; G02B 6/03694
See application file for complete search history.

(56) References Cited

U.S. PATENT DOCUMENTS

| | | | |
|---|---|---|---|
| 4,921,880 A | 5/1990 | Lee et al. | |
| 5,188,864 A | 2/1993 | Lee et al. | |
| 5,242,963 A | 9/1993 | Mao | |
| 5,330,786 A | 7/1994 | Nonaka et al. | |
| 5,887,104 A * | 3/1999 | Sugizaki | G02B 6/02261 385/123 |
| 6,270,492 B1 * | 8/2001 | Sinofsky | A61L 2/10 606/13 |
| 6,321,014 B1 | 11/2001 | Overton et al. | |
| 6,797,740 B2 | 9/2004 | Abel et al. | |
| 7,450,806 B2 | 11/2008 | Bookbinder et al. | |
| 7,923,483 B2 | 4/2011 | Chien et al. | |

(Continued)

OTHER PUBLICATIONS

International Search Report and Written Opinion PCT/US2016/063222 dated Jun. 2, 2017.

(Continued)

*Primary Examiner* — Anh T Mai
*Assistant Examiner* — Glenn D Zimmerman (57) ABSTRACT

A light-diffusing optical fiber that provides a symmetric intensity distribution of forward and backward scattered light is described. The fiber includes a secondary coating that contains scattering centers. Control of the thickness of the secondary coating and concentration of scattering centers provides control over the distribution of scattered intensity. More symmetric distributions of scattered light intensity are realized by increasing the thickness of the secondary coating and/or the concentration of scattering centers in the secondary coating. Representative scattering centers include oxide nanoparticles.

20 Claims, 4 Drawing Sheets

(56) References Cited

U.S. PATENT DOCUMENTS

| | | | |
|---|---|---|---|
| 8,929,703 B2* | 1/2015 | Logunov | G02B 6/0003 385/123 |
| 9,025,923 B2* | 5/2015 | Logunov | G02B 6/001 385/123 |
| 9,146,347 B2 | 9/2015 | Logunov et al. | |
| 2002/0099110 A1 | 7/2002 | Norlin et al. | |
| 2004/0037521 A1 | 2/2004 | Xiong et al. | |
| 2011/0122646 A1 | 5/2011 | Bickham et al. | |
| 2013/0156392 A1* | 6/2013 | Logunov | G02B 6/0003 385/123 |
| 2013/0272014 A1 | 10/2013 | Logunov et al. | |
| 2013/0302003 A1* | 11/2013 | Bookbinder | G02B 6/4403 385/128 |
| 2014/0355295 A1 | 12/2014 | Kuchinisky et al. | |
| 2015/0131955 A1 | 3/2015 | Crossland et al. | |
| 2015/0062954 A1 | 5/2015 | Bennett et al. | |
| 2015/0144802 A1* | 5/2015 | Bauco | G02B 6/001 250/435 |
| 2015/0335773 A1* | 11/2015 | Bauco | A61L 2/10 426/248 |
| 2016/0116660 A1* | 4/2016 | Benjamin | G02B 6/02395 362/553 |
| 2018/0113254 A1* | 4/2018 | Logunov | B60R 1/00 |

OTHER PUBLICATIONS

International Searching Authority Invitation to Pay Additional Fees PCT/US2016/063222 dated Feb. 14, 2017.

Mazumder et al. "analysis of excess scattering in optical fibers" Journal of Applied Physics, vol. 96. pp. 4042-4049 (2004).

* cited by examiner

COATING FOR LIGHT-DIFFUSING OPTICAL FIBERS

This application claims the benefit of priority under 35 U.S.C. § 119 of U.S. Provisional Application Ser. No. 62/259,773 filed on Nov. 25, 2015 the content of which is relied upon and incorporated herein by reference in its entirety.

FIELD

The present specification relates generally to optical fibers designed for illumination applications. More particularly, the present specification relates to light-diffusing optical fibers that scatter light uniformly to provide an illumination effect that is symmetric with respect to viewing angle. Most particularly, the present specification relates to a coating with scattering centers that promotes symmetric scattering of light from a light-diffusing optical fiber in the azimuthal direction.

BACKGROUND

Many optical systems utilize optical fibers to deliver light from a remote light source to a target destination. In a typical system, the light source is coupled to the fiber and light supplied by the source is guided by the fiber to the target destination. Optical fibers have been widely used in telecommunications to deliver information encoded in the form of an optical signal. A telecommunications link includes a transmitter that converts an electrical signal to an optical signal. The optical signal is launched into the fiber and transmitted to a receiver that reconverts the optical signal back to an electrical signal for further processing at the destination end of the link. Optical fibers have also been used as point illumination sources. In these applications, light from a source is coupled to the receiving end of the fiber and emerges from the destination end of the fiber as an illuminating beam.

There has recently been interest in extending the use of optical fibers to applications in broad-area illumination. In these systems, the objective is to achieve controlled release of light along at least portions of the length of the fiber to provide an illumination effect. Instead of using the fiber to confine light and transmit it with minimal losses to provide point illumination to a target positioned in the direction of the fiber axis (on-axis illumination), the objective is to use the lateral surface of the fiber as a broad-area source of illumination that operates in off-axis directions (azimuthal directions) of the fiber.

Light-diffusing fibers are a class of fibers that can be used as a broad-area illumination source. Light-diffusing fibers are designed to scatter light propagating along the fiber axis in azimuthal directions. The scattering is accomplished by incorporating nanostructural voids within or throughout the core and/or cladding regions of the fiber. The voids are low-index regions, typically filled with a gas, and have dimensions on the order of the wavelength of the light propagating through the fiber. The refractive index contrast between the voids and surrounding dense glass matrix effects scattering of the light. The scattering efficiency, and hence intensity of scattered light, can be controlled by controlling the dimensions, spatial arrangement and number density of voids. In addition to broad-area illumination, light-diffusing fibers can be employed in displays and as light sources in photochemical applications. Further information about light-diffusing fibers and representative applications can be found in U.S. Pat. No. 7,450,806 and U.S. Pat. Appl. Pub. No. 20110122646, the disclosures of which are hereby incorporated by reference herein.

Light-diffusing fibers are versatile and compact sources of broad-area lateral (off-axis) illumination and offer the further advantage of maintaining functionality when bent. This allows light-diffusing fibers to be deployed as illumination sources in tight spaces and areas where it is impossible to deploy conventional light sources.

To improve the aesthetic perception of illumination, it is desirable for the light-diffusing fiber to provide an illumination effect that is symmetric with respect to viewing angle. Symmetric illumination requires symmetric scattering of light from the light-diffusing fiber, which imposes significant practical constraints on the number, size, uniformity, and spatial distribution of voids in the light-diffusing fiber. To overcome the constraints, current light-diffusing fiber systems employ one of two designs. In a first design, two light sources positioned at opposite ends of the fiber are used to provide the illumination light. The light sources deliver light to the core portion of the light diffusing fiber and the core light is scattered to provide illumination. Any asymmetry in scattering of light propagating in one direction along the fiber is counteracted by light propagating in the opposite direction to provide a net illumination effect that is more nearly symmetric with respect to viewing angle. In a second design, a single light source is coupled to one end of the light-diffusing fiber and the opposite end of the light-diffusing fiber is coated with a reflective material. Source light that propagates through the fiber is reflected to provide counter-propagating light that improves the symmetry of illumination.

Applications of light-diffusing fibers as illumination sources could be expanded if systems capable of providing symmetric illumination that utilize a light-diffusing fiber with a single light source without a reflective end coating were available. Current systems that utilize a light-diffusing fiber with a single light source and no reflective end coating provide asymmetric illumination and inferior illumination aesthetics. There is a need to design light-diffusing fibers capable of providing symmetric illumination when illuminated with a single light source in the absence of counter-propagating light that corrects the symmetry of illumination with respect to viewing angle.

SUMMARY

A light-diffusing optical fiber that provides a symmetric intensity distribution of forward and backward scattered light is described. The fiber includes a secondary coating that contains scattering centers. Control of the thickness of the secondary coating and concentration of scattering centers provides control over the distribution of scattered intensity. More symmetric distributions of scattered light intensity are realized by increasing the thickness of the secondary coating and/or the concentration of scattering centers in the secondary coating. Representative scattering centers include oxide nanoparticles.

The present specification extends to:
A light-diffusing optical fiber comprising:
  a glass core, said glass core comprising voids; and
  a cladding surrounding said glass core; and
  a secondary coating surrounding said cladding, said secondary coating comprising scattering centers, said scattering centers having a concentration of at least 0.5 wt % in said secondary coating.

The present specification extends to:
A light-diffusing optical fiber comprising:
  a glass core, said glass core comprising voids; and
  a cladding surrounding said glass core; and
  a secondary coating surrounding said cladding, said secondary coating comprising scattering centers, said scattering centers having a concentration of at least 1.5 wt % in said secondary coating.

The present specification extends to:
A light-diffusing optical fiber comprising:
  a glass core, said glass core comprising voids; and
  a cladding surrounding said glass core; and
  a secondary coating surrounding said cladding, said secondary coating comprising scattering centers;
  wherein said light-diffusing optical fiber is configured to scatter light propagating in said glass core in a first azimuthal direction having an azimuthal angle $\theta_1$ and in a second azimuthal direction having an azimuthal angle $180°-\theta_1$; and
  wherein the ratio of the intensity of light scattered in said first azimuthal direction to the intensity of light scattered in said second azimuthal direction is in the range from 0.5-1.5.

The present specification extends to:
A light-diffusing optical fiber comprising:
  a glass core, said glass core comprising voids; and
  a cladding surrounding said glass core; and
  a secondary coating surrounding said cladding, said secondary coating comprising scattering centers;
  wherein said light-diffusing optical fiber is configured to scatter light propagating in said glass core in a first plurality of azimuthal directions spanning a first plurality of azimuthal angles and in a second plurality of azimuthal directions spanning a second plurality of azimuthal angles, said second plurality of azimuthal angles corresponding to supplements of said first plurality of azimuthal angles; and
  wherein the ratio of the intensity of light scattered in two or more of said first plurality of azimuthal directions to the intensity of light scattered in two or more of said second plurality of azimuthal directions is in the range from 0.5-1.5, said two or more of said first plurality of azimuthal directions corresponding to two or more of said first plurality of azimuthal angles and said two or more of said second plurality of azimuthal directions having azimuthal angles corresponding to supplements of said two or more of said first plurality of azimuthal angles.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material. Elements in contact may be rigidly or non-rigidly joined. Contacting refers to placing two elements in direct or indirect contact. Elements in direct (indirect) contact may be said to directly (indirectly) contact each other.

Reference will now be made in detail to illustrative embodiments of the present specification.

The present specification provides a light-diffusing fiber and illumination system including the light-diffusing fiber that are designed to provide azimuthal illumination that is symmetric with respect to viewing angle. The illumination system employs a single light source, which is coupled to one end of the light-diffusing fiber. The opposite end of the light-diffusing fiber lacks a reflective coating. The symmetric illumination results from a symmetric distribution of scattered intensity from the light-diffusing fiber. Symmetric scattering intensity is achieved by incorporating scattering centers in the secondary coating of the light-diffusing fiber and appropriately controlling the concentration of scattering centers and the thickness of the secondary coating.

As used herein, azimuthal illumination refers to illumination in an off-axis direction. The on-axis direction is the longitudinal or axial direction of the light-diffusing fiber. The axial direction corresponds to the centerline direction of the light-diffusing fiber or a direction parallel to the centerline direction of the light-diffusing fiber. The axial direction conforms to the spatial configuration of the light-diffusing fiber and may not be a linear direction. If the light-diffusing fiber is arranged in a bent or curved configuration, for example, the axial direction conforms to the bend or curvature and remains consistent with the centerline. An off-axis direction is a direction other than the on-axis direction. An off-axis direction may also be referred to herein as a lateral direction or an azimuthal direction. Azimuthal illumination may also be regarded as corresponding to illumination produced by light released from the light-diffusing fiber through the outermost coating. The outermost coating is typically a secondary coating and in the context of the present specification, the secondary coating includes scattering centers. The illumination system includes a light source that is coupled to an end of the light diffusing fiber. The light source provides light to the core of the light-diffusing fiber. The core includes voids or other light-diffusing features that direct the light in off-axis directions. The directed light exits the core, passes through the cladding and primary coating, and enters the secondary coating. In the secondary coating, the light is scattered by scattering centers and scattered out of the light-diffusing fiber to provide light that is perceived as illumination by a viewer.

Figure 1:
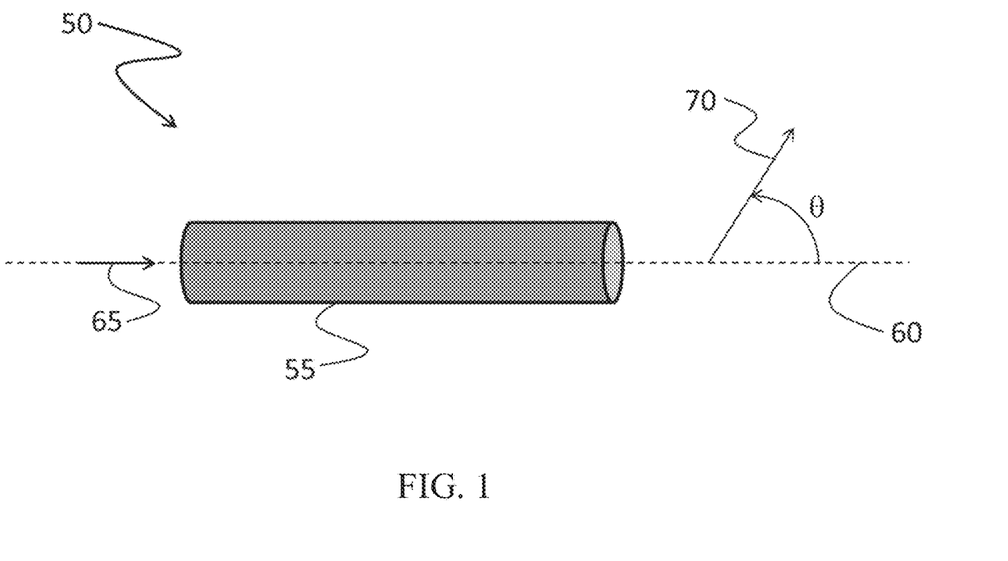
FIG. 1 illustrates the azimuthal angle $\theta$ of light scattered from a light-diffusing fiber.

The direction of off-axis illumination may be quantified in terms of an azimuthal angle. FIG. 1 illustrates light-diffusing fiber 50 having centerline 60. Light-diffusing fiber 50 receives input light 65 along centerline 60 from a light source (not shown). Centerline 60 defines the axial or on-axis direction of light propagation through light-diffusing fiber 50. Input light 65 enters light-diffusing fiber and is redirected through secondary coating 55 (which includes scattering centers) out of light-diffusing fiber 50 to provide scattered light. The direction of scattering is described by azimuthal angle θ. Azimuthal angle θ is measured relative to centerline 60 and will be expressed herein in units of degrees. Ray 70 represents the azimuthal direction associated with azimuthal angle θ. The axial direction corresponds to θ=0° and represents the direction of light propagation along the centerline of light-diffusing fiber 50. The radial direction corresponds to θ=90°. The direction of counter-propagation of light along centerline 60 corresponds to θ=180°. The scattered light is redirected over a range of azimuthal angles, where the scattered intensity depends on the azimuthal angle. Although depicted in two dimensions for convenience, it is understood that scattered light is distributed in three dimensions and that azimuthal angle θ is more accurately described as the half-angle of the cone obtained by rotating ray 70 about centerline 60.

The present light-diffusing fiber is designed to provide a symmetric distribution of scattered light intensity in two or more azimuthal directions, where each azimuthal direction is defined by a distinct azimuthal angle. As used herein, a symmetric distribution of scattered light intensity corresponds to a scattered intensity that is the same or approximately the same at an azimuthal angle θ and the supplement of the azimuthal angle θ, where the supplement of azimuthal angle θ is defined as 180°-θ.

Figure 2:
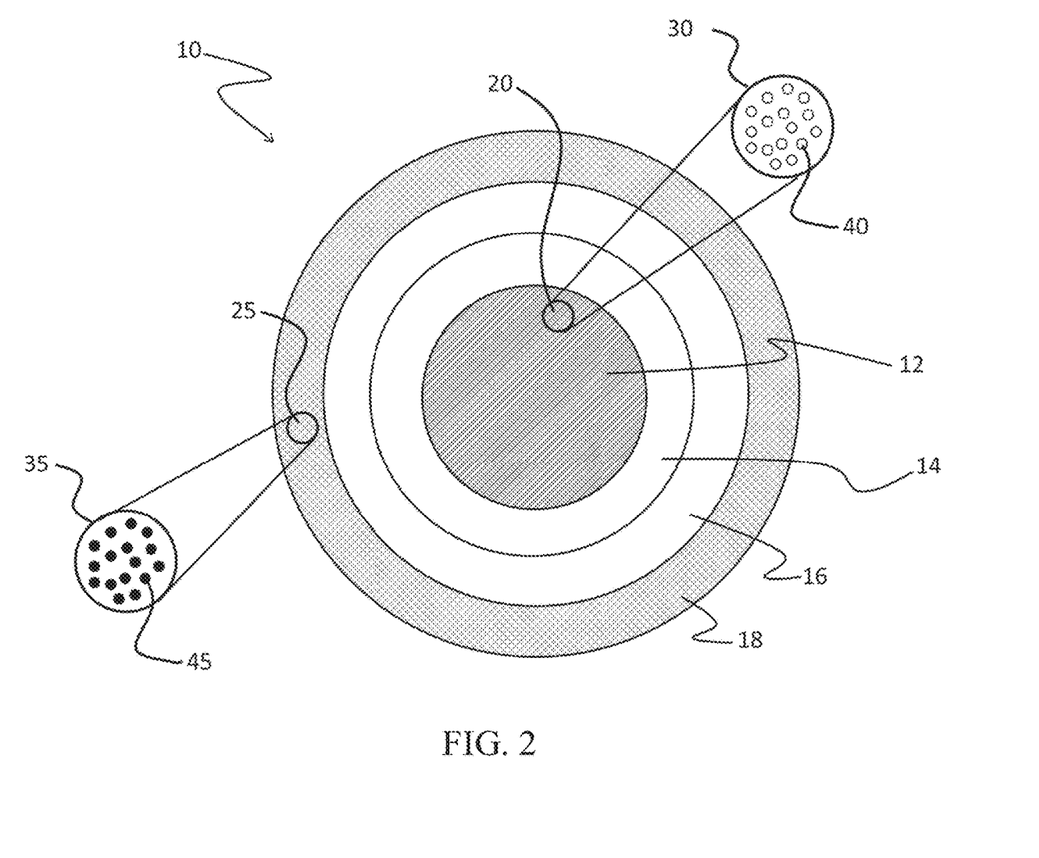
FIG. 2 is a schematic depiction of the cross section of a light-diffusing fiber.

The light-diffusing fiber includes a glass core, cladding, and a secondary coating. The cladding surrounds the core and the secondary coating surrounds the cladding. The light-diffusing fiber optionally includes a primary coating between the cladding and the secondary coating. FIG. 2 depicts the typical cross-section of an embodiment of a light-diffusing fiber. Light-diffusing fiber 10 includes core 12, cladding 14, primary coating 16, and secondary coating 18. Enlargement 30 of region 20 of core 12 shows voids 40. Enlargement 35 of region 25 of secondary coating 18 shows scattering centers 45. Although not depicted, voids may also be present in cladding 14 and scattering centers may also be present in primary coating 16.

The length of light-diffusing fiber 10 may be at least 1 cm, or at least 5 cm, or at least 20 cm, or at least 50 cm, or at least 100 cm, or between 1 cm and 1000 cm, or between 1 cm and 100 cm, or between 1 cm and 50 cm, or between 1 cm and 20 cm, or between 5 cm and 100 cm, or between 5 cm and 50 cm, or between 5 cm and 20 cm.

The core is glass, such as silica glass or modified silica glass. The cross-sectional dimension of the core may be at least 65 µm, or at least 80 µm, or at least 100 um, or at least 150 µm, or at least 200 µm, or at least 250 µm, or at least 300 µm, or between 65 µm and 500 µm, or between 100 µm and 400 µm, or between 200 µm and 350 µm. In one embodiment, the cross section of the core is round and the cross-sectional dimension is a diameter.

Voids are internal gas-filled regions within the core and/or cladding. Gases that fill the internal voids include $SO_2$, noble gases, $CO_2$, $N_2$, $O_2$, air, or mixtures thereof. The internal voids have a lower refractive index than the surrounding solid core or solid cladding material. When present, internal voids contribute to a reduction in the average refractive index of the core or cladding and operate to scatter light within and out of the core and/or cladding. The internal voids may be distributed throughout the cross-section of the core and/or cladding or localized within one or more discrete regions thereof. The internal voids may be configured in a random or non-periodic arrangement and may have a uniform or non-uniform distribution of size or number.

In glass, the internal voids may have a cross-section with a dimension of at least 50 nm, or at least 100 nm, or at least 500 nm, or between 50 nm and 20 µm, or between 100 nm and 10 µm or between 500 nm and 10 µm, or between 500 nm and 5 µm. In glass, the internal voids may have a length in the range from a few microns to a several meters; for example between 1 µm and 50 m, or between 10 µm and 30 m, or between 100 µm and 20 m, or between 1 µm and 1 m, or between 1 µm and 10 cm, or between 10 µm and 10 m or between 10 µm and 1 m, or between 10 µm and 100 cm, or between 10 µm and 10 cm, or between 100 µm and 1 m. The internal voids within the core or cladding may include a distribution of cross-sectional dimensions and lengths.

In the core, the internal voids may occupy a fill fraction of between 0.5% and 20% of the core, or between 1% and 15% of the core, or between 2% and 10% of the core. As used herein, fill fraction refers to the fraction of the cross-sectional area occupied by the internal voids. In one embodiment, the fill fraction is constant along the length of the light-diffusing element. In another embodiment, the fill fraction varies along the length of the light-diffusing element. To a good approximation, the fill fraction corresponds to the volume fraction of internal voids. The volume fraction of voids within the core may be at least 0.5%, or at least 1.0%, or at least 2.0%, or at least 5.0%, or between 0.5% and 20%, or between 1% and 15%, or between 2% and 10%.

The cross-sectional distribution of internal voids may vary at different positions in the core and/or cladding along the length of the light-diffusing element. As noted, the length and cross-sectional attributes (e.g. shape, size, density, fill fraction) of the internal voids may vary. The variations may also occur in the axial or length direction of the light-diffusing element. Since the length of the internal voids may not extend the full length of the light-diffusing element, particular internal voids may be present in some cross-sections and absent in other cross-sections along the length of the light-diffusing fiber.

As is known in the art, voids are one embodiment of light-diffusing features in light-diffusing fibers. Other embodiments of light-diffusing features include localized regions within the core (and/or cladding) that differ in refractive index from the material out of which the core (and/or cladding) is made. The localized regions may consist of a gas, liquid or solid that provides an index contrast relative to the core (and/or cladding). Exemplary light-diffusing features include dopants and nanoparticles.

The cladding may be glass or a polymer. Cladding glasses include silica glass or modified silica glass. Cladding polymers include acrylate polymers, such as the type described hereinbelow for the primary coating or fluorinated variants thereof (fluoroacrylate polymers). Inclusion of fluorine in the cladding polymer leads to a lowering of refractive index and is helpful to the objective of maintaining a refractive index for the cladding polymer that is less than the refractive index of the core. The refractive index of the cladding may be less than the refractive index of the core by at least 0.002, or at least 0.003, or at least 0.004, or at least 0.005, or at least 0.007, or at least 0.010. The thickness of the cladding may be at least 10 µm, or at least 15 µm, at least 20 µm, at least 25 µm, or between 10 µm and 80 µm, or between 10 µm and 40 µm, or between 15 µm and 35 µm, or between 20 µm and 30 µm. In one embodiment, the cladding has an annular shape and surrounds a core having a round cross section. The cladding contacts the core. The cladding may directly contact the core.

The cladding may include voids or other light-diffusing features. In cladding glass, voids have dimensions (cross section, length) as described hereinabove for core glass. In cladding polymer, the internal voids may have a cross-section with a dimension or at least 25 nm, or at least 100 nm, or at least 250 nm, or at least 500 nm, or at least 1000 nm, or between 25 nm and 40 µm, or between 100 nm and 40 µm, or between 250 nm and 40 µm, between 500 nm and 20 µm, or between 1000 nm and 10 µm. In cladding polymer, the internal voids may have a length between 25 nm and 40 µm, or between 100 nm and 40 µm, or between 250 nm and 40 µm, or between 250 nm and 20 µm, or between 500 nm and 40 µm, or between 500 nm and 20 µm, or between 500 nm and 10 µm, or between 500 nm and 5 µm. In the cladding (glass or polymer), the internal voids may occupy a fill fraction of between 0.5% and 30% of the cladding, or between 1% and 15% of the cladding, or between 2% and 10% of the cladding. The volume fraction of voids within the cladding (glass or polymer) may be at least 0.5%, or at least 1.0%, or at least 2.0%, or at least 5.0%, or between 0.5% and 30%, or between 1.0% and 15%, or between 2.0% and 10%, or between 2.0% and 30%, or between 3.0% and 20%.

The optional primary coating is a low modulus material that may be included to better protect the glass portions of the light-diffusing fiber by dissipating mechanical disturbances transmitted through the secondary coating when the light-diffusing fiber is subjected to an external force. When present, the primary coating surrounds and contacts the cladding. The primary coating may be in direct contact with the cladding. The primary coating may be in direct contact with the cladding and the cladding may be in direct contact with the core.

In one embodiment, the primary coating is the cured product of a primary composition that includes a curable crosslinker, a curable diluent, and a polymerization initiator. The primary composition may include one or more curable crosslinkers, one or more curable diluents, and/or one or more polymerization initiators. In one embodiment, the curable crosslinker is essentially free of urethane and urea functional groups.

As used herein, the term "curable" is intended to mean that the component, when exposed to a suitable source of curing energy, includes one or more curable functional groups capable of forming covalent bonds that participate in linking the component to itself or to other components to form a polymeric coating material (i.e., the cured product). The curing process may be induced by radiation or by thermal energy. A radiation-curable component is a component that can be induced to undergo a curing reaction when exposed to radiation of a suitable wavelength at a suitable intensity for a sufficient period of time. The radiation curing reaction may occur in the presence of a photoinitiator. A radiation-curable component may also optionally be thermally curable. Similarly, a thermally-curable component is a component that can be induced to undergo a curing reaction when exposed to thermal energy of sufficient intensity for a sufficient period of time. A thermally curable component may also optionally be radiation curable.

A curable component may include one or more curable functional groups. A curable component with only one curable functional group may be referred to herein as a monofunctional curable component. A curable component having two or more curable functional groups may be referred to herein as a multifunctional curable component or a polyfunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Examples of functional groups that participate in covalent bond formation during the curing process are identified hereinafter.

In the description of the primary composition that follows, various components of primary compositions used to form the primary coating will be discussed and the amounts of particular components in the primary composition will be specified in terms of weight percent (wt %) or parts per hundred (pph). The components of the primary composition include base components and additives. The concentration of base components will be expressed in terms of wt % and the concentration of additives will be expressed in terms of pph.

As used herein, the weight percent of a particular base component refers to the amount of the component present in the primary composition on a basis that excludes additives. The additive-free primary composition includes only base components and may be referred to herein as a base primary composition. Any crosslinker component(s), diluent component(s), and polymerization initiator(s) present in a primary composition are regarded individually as base primary components and collectively as a base primary composition. The base primary composition minimally includes a radiation-curable component and a polymerization initiator. The radiation-curable component may be a radiation-curable crosslinker or a radiation-curable diluent. The base primary composition may, however, include one or more radiation-curable crosslinker components, one or more radiation-curable diluent components, one or more non-radiationcurable components, and one or more polymerization initiators. The collective amount of base primary components in a primary composition is regarded herein as equaling 100 weight percent.

Additives are optional and may include one or more of an adhesion promoter, an antioxidant, a catalyst, a carrier or surfactant, a tackifier, a stabilizer, and an optical brightener. Representative additives are described in more detail hereinbelow. The amount of additives introduced into the primary composition is expressed herein in parts per hundred (pph) relative to the base primary composition. For example, if 1 g of a particular additive is added to 100 g of base primary composition, the concentration of additive will be expressed herein as 1 pph.

In one embodiment, the curable crosslinker is a radiation curable component of the primary composition, and as such it includes one or more functional groups capable of participating in the covalent bonding or crosslinking of the crosslinker into the polymeric cladding material. In one embodiment, the curable crosslinker includes two or more radiation-curable functional groups. Exemplary functional groups capable of participating in the crosslinking include α,β-unsaturated ester, amide, imide or vinyl ether groups.

In one embodiment, the curable crosslinker of the primary composition is essentially free of urethane or urea groups. The curable crosslinker may also be essentially free of thiourethane or thiourea groups. By "essentially free" it is preferable that less than 1 weight percent of the curable crosslinker component includes (thio)urethane or (thio)urea groups. In preferred embodiments, less than 0.5 weight percent of the total curable crosslinker component includes (thio)urethane or (thio)urea groups. In most preferred embodiments, the curable crosslinker component is entirely free of both (thio)urethane and (thio)urea groups.

When identifying certain groups, such as urethane and thiourethane groups, or urea and thiourea groups, or isocyanate or thioisocyanate groups, these groups may be generically identified herein as (thio)urethane, (thio)urea, or (thio)isocyanate or di(thio)isocyanate to indicate that the sulfur atom(s) may or may not be present in the group. Such groups may be referred to herein as (thio)groups and components containing (thio)groups may be referred to herein as (thio) components. The present embodiments extend to primary compositions that include (thio)components with sulfur atom(s) or without sulfur atom(s) in the (thio)functional group as well as compositions that include some (thio) components with sulfur atom(s) and some (thio)components without sulfur atom(s).

In certain embodiments, the curable crosslinker component of the primary composition includes one or more polyols that contain two or more α,β-unsaturated ester, amide, imide, or vinyl ether groups, or combinations thereof. Exemplary classes of these polyol crosslinkers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety of the curable crosslinker can be a polyether polyol, a polyester polyol, a polycarbonate polyol, or a hydrocarbon polyol.

The curable crosslinker component of the primary composition preferably has a molecular weight of between about 150 g/mol and about 15000 g/mol, in some embodiments more preferably between about 200 g/mol and about 9000 g/mol, in some embodiments preferably between about 1000 g/mol and about 5000 g/mol, in other embodiments preferably between about 200 g/mol and about 1000 g/mol. The curable crosslinker may further have a molecular weight in the range from 100 g/mol to 3000 g/mol, or in the range from 150 g/mol to 2500 g/mol, or in the range from 200 g/mol to 2000 g/mol, or in the range from 500 g/mol to 1500 g/mol.

The curable crosslinker component is present in the primary composition in an amount of about 1 to about 20 percent by weight, or in an amount of about 2 to about 15 percent by weight, or in an amount of about 3 to about 10 percent by weight.

The curable diluent of the primary composition is a generally lower molecular weight (i.e., about 120 to 600 g/mol) liquid monomer that is added to the formulation to control the viscosity to provide the fluidity needed to apply the primary coating composition with conventional liquid coating equipment. The curable diluent contains at least one functional group that allows the diluent, upon activation during curing, to link to the polymer formed during the curing process from the curable crosslinker and other curable components. Functional groups that may be present in the curable diluent include, without limitation, acrylate, methacrylate, maleate, fumarate, maleimide, vinyl ether, and acrylamide groups.

Monofunctional diluents will contain only a single reactive (curable) functional group, whereas polyfunctional diluents will contain two or more reactive (curable) functional groups. Whereas the former can link to the cladding polymer network during curing, the latter can form crosslinks within the cladding polymer network.

When it is desirable to utilize moisture-resistant components, the diluent component will be selected on the basis of its compatibility with the selected moisture-resistant crosslinker(s) or component(s). Not all such liquid monomers may be successfully blended and copolymerized with the moisture-resistant crosslinker(s) or component(s) because such crosslinker(s) or component(s) are highly non-polar. For satisfactory primary composition compatibility and moisture resistance, it is desirable to use a liquid acrylate monomer component comprising a predominantly saturated aliphatic mono- or di-acrylate monomer or alkoxy acrylate monomers.

Suitable polyfunctional ethylenically unsaturated monomer diluents for the primary composition include, without limitation, the following compounds and fluorinated variants thereof: methylolpropane polyacrylates with and without alkoxylation such as ethoxylated trimethylolpropane triacrylate with the degree of ethoxylation being 3 or greater, preferably ranging from 3 to about 30 (e.g. Photomer 4149 available from IGM Resins, and SR499 available from Sartomer Company, Inc.), propoxylated trimethylolpropane triacrylate with the degree of propoxylation being 3 or greater, preferably ranging from 3 to 30 (e.g. Photomer 4072 available from IGM Resins; and SR492 and SR501 available from Sartomer Company, Inc.), and ditrimethylolpropane tetraacrylate (e.g. Photomer 4355 available from IGM Resins); alkoxylated glyceryl triacrylates such as propoxylated glyceryl triacrylate with the degree of propoxylation being 3 or greater (e.g. Photomer 4096 available from IGM Resins; and SR9020 available from Sartomer Company, Inc.); erythritol polyacrylates with and without alkoxylation, such as pentaerythritol tetraacrylate (e.g. SR295 available from Sartomer Company, Inc.), ethoxylated pentaerythritol tetraacrylate (e.g. SR494 available from Sartomer Company, Inc.), and dipentaerythritol pentaacrylate (e.g. Photomer 4399 available from IGM Resins; and SR399 available from Sartomer Company, Inc.); isocyanurate polyacrylates formed by reacting an appropriate functional isocyanurate with an acrylic acid or acryloyl chloride, such as tris-(2- hydroxyethyl)isocyanurate triacrylate (e.g. SR368 available from Sartomer Company, Inc.) and tris-(2-hydroxyethyl) isocyanurate diacrylate; alcohol polyacrylates with and without alkoxylation such as tricyclodecane dimethanol diacrylate (e.g. CD406 available from Sartomer Company, Inc.), alkoxylated hexanediol diacrylate (e.g. CD564 available from Sartomer Company, Inc.), tripropylene glycol diacrylate (e.g. SR306 available from Sartomer Company, Inc.) and ethoxylated polyethylene glycol diacrylate with a degree of ethoxylation being 2 or greater, preferably ranging from about 2 to 30; epoxy acrylates formed by adding acrylate to bisphenol A diglycidylether and the like (e.g. Photomer 3016 available from IGM Resins); and single and multi-ring cyclic aromatic or non-aromatic polyacrylates such as dicyclopentadiene diacrylate.

It may also be desirable to use certain amounts of monofunctional ethylenically unsaturated monomer diluents in the primary composition, which can be introduced to influence the degree to which the cured product absorbs water, adheres to other primary composition materials, or behaves under stress. Exemplary monofunctional ethylenically unsaturated monomer diluents include, without limitation, the following compounds as well as fluorinated variants thereof: hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (e.g. SR440 available from Sartomer Company, Inc. and Ageflex FA8 available from CPS Chemical Co.), 2-ethylhexyl acrylate, nonyl acrylate, decyl acrylate, isodecyl acrylate (e.g. SR395 available from Sartomer Company, Inc.; and Ageflex FA10 available from CPS Chemical Co.), undecyl acrylate, dodecyl acrylate, tridecyl acrylate (e.g. SR489 available from Sartomer Company, Inc.), lauryl acrylate (e.g. SR335 available from Sartomer Company, Inc., Ageflex FA12 available from CPS Chemical Co. (Old Bridge, N.J.), and Photomer 4812 available from IGM Resins), octadecyl acrylate, and stearyl acrylate (e.g. SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g. SR339 available from Sartomer Company, Inc., Ageflex PEA available from CPS Chemical Co., and Photomer 4035 available from IGM Resins), phenoxyglycidyl acrylate (e.g. CN131 available from Sartomer Company, Inc.), lauryloxyglycidyl acrylate (e.g. CN130 available from Sartomer Company, Inc.), and ethoxyethoxyethyl acrylate (e.g. SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g. SR423 and SR506 available from Sartomer Company, Inc., and Ageflex IBOA available from CPS Chemical Co.), tetrahydrofurfuryl acrylate (e.g. SR285 available from Sartomer Company, Inc.), caprolactone acrylate (e.g. SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g. Photomer 4066 available from IGM Resins; and SR504 available from Sartomer Company, Inc.) and propoxylatednonylphenol acrylate (e.g. Photomer 4960 available from IGM Resins); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from International Specialty Products, Wayne, N.J.); and acid esters such as maleic acid ester and fumaric acid ester.

The curable monomer diluent of the primary composition can include a single diluent component, or combinations of two or more monomer diluent components. The curable monomer diluent(s) is (are collectively) typically present in the primary composition in amounts of about 10 to about 60 percent by weight, more preferably between about 20 to about 50 percent by weight, and most preferably between about 25 to about 45 percent by weight.

The primary composition includes a polymerization initiator. The polymerization initiator is a reagent that is suitable to cause polymerization (i.e., curing) of the primary composition after its application to the core of the light-diffusing element. Polymerization initiators suitable for use in the primary compositions include thermal initiators, chemical initiators, electron beam initiators, and photoinitiators. Photoinitiators are the preferred polymerization initiators. For most acrylate-based cladding polymer formulations, conventional photoinitiators, such as the known ketonic photoinitiators and/or phosphine oxide photoinitiators, are preferred. When used in the primary composition, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, should provide reasonable cure speed without causing premature gelation of the primary coating composition. A desirable cure speed is any speed sufficient to cause substantial curing of the coating materials.

Suitable photoinitiators include, without limitation, 1-hydroxycyclohexylphenyl ketone (e.g. Irgacure 184 available from BASF), (2,6-dimethoxybenzoyl)-2,4,4-trimethylpentyl phosphine oxide (e.g. commercial blends Irgacure 1800, 1850, and 1700 available from BASF), 2,2-dimethoxyl-2-phenyl acetophenone (e.g. Irgacure 651, available from BASF), bis(2,4,6-trimethyl benzoyl)phenyl-phosphine oxide (e.g. Irgacure 819, available from BASF), (2,4,6-trimethylbenzoyl)diphenyl phosphine oxide (e.g. Lucerin TPO available from BASF, Munich, Germany), ethoxy(2,4,6-trimethylbenzoyl)phenyl phosphine oxide (e.g. Lucerin TPO-L from BASF), and combinations thereof.

The primary composition may also include one or more additives. Representative additives include an adhesion promoter, an antioxidant, a catalyst, a carrier or surfactant, a tackifier, a stabilizer, and an optical brightener. Some additives (e.g., catalysts, reactive surfactants, and optical brighteners) may operate to control the polymerization process and may thereby affect the physical properties (e.g., modulus, glass transition temperature) of the cured product formed from the primary composition. Other additives may influence the integrity of the cured product of the primary composition (e.g., protect against de-polymerization or oxidative degradation).

An adhesion promoter enhances the adhesion of the primary coating to the underlying glass fiber. Any suitable adhesion promoter can be employed. Examples of a suitable adhesion promoter include, without limitation, organofunctional silanes, titanates, zirconates, and mixtures thereof. One preferred class are the poly(alkoxy)silanes. Suitable alternative adhesion promoters include, without limitation, bis(trimethoxysilylethyl)benzene, 3-mercaptopropyltrimethoxysilane (3-MPTMS, available from United Chemical Technologies, Bristol, Pa.; also available from Gelest, Morrisville, Pa.), 3-acryloxypropyltrimethoxysilane (available from Gelest), and 3-methacryloxypropyltrimethoxysilane (available from Gelest), and bis(trimethoxysilylethyl)benzene (available from Gelest). Other suitable adhesion promoters are described in U.S. Pat. Nos. 4,921,880 and 5,188,864 to Lee et al., each of which is hereby incorporated by reference. The adhesion promoter, if present, is used in an amount between about 0.1 to about 10 pph, more preferably about 0.25 to about 3 pph.

Any suitable antioxidant can be employed in the primary composition. Preferred antioxidants include, without limitation, bis hindered phenolic sulfide or thiodiethylene bis(3,5-di-tert-butyl)-4-hydroxyhydrocinnamate (e.g. Irganox 1035, available from BASF), 2,6-di-t-butyl-4-methylphenol (BHT). The antioxidant, if present, is used in an amount between about 0.1 pph to about 3 pph, more preferably about 0.25 pph to about 2 pph.

Suitable carriers for the primary composition, more specifically carriers which function as reactive surfactants, include polyalkoxypolysiloxanes. Exemplary preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 pph to about 5 pph, more preferably about 0.25 pph to about 3 pph. Other classes of suitable carriers are polyols and non-reactive surfactants. Examples of suitable polyols and non-reactive surfactants include, without limitation, the polyol Acclaim 3201 (poly(ethylene oxide-co-propylene oxide)) available from Bayer (Newtown Square, Pa.), and the non-reactive surfactant Tegoglide 435 (polyalkoxy-polysiloxane) available from Goldschmidt Chemical Co. The polyol or non-reactive surfactants may be present in a preferred amount between about 0.01 pph to about 10 pph, more preferably about 0.05 pph to about 5 pph, most preferably about 0.1 pph to about 2.5 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A tackifier is an example of one such ambiphilic molecule. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive that is commonly used in the adhesives industry, and is known to enhance the ability of a coating to create a bond with an object that the coating is applied upon. One preferred tackifier is Uni-tac® R-40 (hereinafter "R-40") available from International Paper Co., Purchase, N.Y. R-40 is a tall oil rosin, which contains a polyether segment, and is from the chemical family of abietic esters. A suitable alternative tackifier is the Escorez® series of hydrocarbon tackifiers available from Exxon. For additional information regarding Escorez® tackifiers, see U.S. Pat. No. 5,242,963 to Mao, which is hereby incorporated by reference in its entirety. The aforementioned carriers may also be used in combination. Preferably, the tackifier is present in the composition in an amount between about 0.01 pph to about 10 pph, more preferably in the amount between about 0.05 pph to about 5 pph.

Any suitable stabilizer can be employed in the primary composition. One preferred stabilizer is a tetrafunctional thiol, e.g., pentaerythritol tetrakis(3-mercaptopropionate) from Sigma-Aldrich (St. Louis, Mo.). The stabilizer, if present, is used in an amount between about 0.01 pph to about 1 pph, more preferably about 0.01 pph to about 0.2 pph.

Any suitable optical brightener can be employed in the primary composition. Exemplary optical brighteners include, without limitation, Uvitex OB, a 2,5-thiophenediylbis(5-tert-butyl-1,3-benzoxazole) (BASF); Blankophor KLA, available from Bayer; bisbenzoxazole compounds; phenylcoumarin compounds; and bis(styryl)biphenyl compounds. The optical brightener is desirably present in the composition at a concentration of about 0.003 pph to about 0.5 pph, more preferably about 0.005 pph to about 0.3 pph.

The Young's modulus of the primary coating is reported herein as the Young's modulus of the cured primary coating composition when configured as a cured film having thickness of 80 μm. Films can be prepared by drawing down the liquid primary coating composition on silicone-treated release paper mounted on a glass plate. The draw down bar provides a liquid coating of the primary composition with a uniform thickness of 5 mil (~125 μm). Films can be prepared by curing the liquid formulations using a Fusion D lamp with a nitrogen purge using a curing dose of approximately 1200 mJ/cm$^2$. The resulting cured films are conditioned overnight in a controlled environment at 23° C. and 50% relative humidity. The thickness of films cured by this procedure is ~80 μm. The cured film formed from the primary coating composition may have a Young's modulus less than 1.5 MPa, or less than 1.25 MPa, or less than 1.0 MPa, or less than 0.8 MPa, or less than 0.6 MPa.

When present, the thickness of the primary coating may be in the range from 5 μm-50 μm, or in the range from 10 μm-35 μm, or in the range from 15 μm-30 μm.

The secondary coating of the light-diffusing fiber is intended to protect the light-diffusing element from mechanical damage. The secondary coating further includes scattering centers that promote a symmetric distribution of scattered light intensity from the light-diffusing fiber.

In one embodiment, the secondary coating surrounds the cladding. The secondary coating may be in direct contact with the cladding. In another embodiment, the secondary coating surrounds and contacts the primary coating. The secondary coating may be in direct contact with the primary coating. The secondary coating may be in direct contact with the primary coating, which may surround and be in direct contact with the cladding, which may surround and be in direct contact with the core.

The secondary coating may be formed from a curable secondary coating composition that includes one or more monomers. The monomers may include ethylenically unsaturated compounds. The curable secondary coating composition may also include one or more oligomers, one or more polymerization initiators, and one or more additives. In one embodiment, the secondary coating is the polymerization product of a secondary coating composition that contains urethane acrylate monomers.

The monomer component of the curable secondary coating composition may include one or more monomers. The one or more monomers maybe present in an amount of 50 wt % or greater, or in an amount from about 75 wt % to about 99 wt %, or in an amount from about 80 wt % to about 99 wt % or in an amount from about 85 wt % to about 98 wt %.

The monomer component of the curable secondary coating composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of monofunctional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers for the curable secondary coating composition include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Representative polyfunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

The curable secondary coating composition may or may not include an oligomeric component. One or more oligomers may be optionally present in the curable secondary coating composition. One class of oligomers that may be included is ethylenically unsaturated oligomers. When employed, suitable oligomers may be monofunctional oligomers, polyfunctional oligomers, or a combination of a monofunctional oligomer and a polyfunctional oligomer. If present, the oligomer component may include aliphatic and aromatic urethane (meth)acrylate oligomers, urea (meth) acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The secondary coating composition may be free of urethane groups, urethane acrylate compounds, urethane oligomers, or urethane acrylate oligomers.

The optional oligomeric component of the curable secondary coating composition may include a difunctional oligomer. A difunctional oligomer may have a structure according to formula (I) below:

$$F_1-R_1-[\text{urethane-}R_2\text{-urethane}]_m-R_1-F_1 \qquad (I)$$

where $F_1$ may independently be a reactive functional group such as acrylate, methacrylate, acrylamide, N-vinyl amide, styrene, vinyl ether, vinyl ester, or other functional group known in the art; $R_1$ may include, independently, $-C_{2-12}O-$, $-(C_{2-4}-O)_n-$, $-C_{2-12}O-(C_{2-4}\ O)_n-$, $-C_{2-12}O-(CO-C_{2-5}O)_n-$, or $-C_{2-12}O-(CO-C_{2-5}NH)_n-$ where n is a whole number from 1 to 30, including, for example, from 1 to 10; $R_2$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_2$ and/or $R_1$. The term "independently" is used herein to indicate that each $F_1$ may differ from another $F_1$ and the same is true for each $R_1$.

The optional oligomer component of the curable secondary coating composition may include a polyfunctional oligomer. The polyfunctional oligomer may have a structure according to formula (II), formula (III), or formula (IV) set forth below:

$$\text{multiurethane-}(F_2R_1\text{---}F_2)_x \quad (II)$$

$$\text{polyol-[(urethane-}R_2\text{-urethane)}_m\text{-}R_1\text{---}F_2]_x \quad (III)$$

$$\text{multiurethane-}(R_1\text{---}F_2)_x \quad (IV)$$

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include $-C_{2-12}O-$, $-(C_{2-4}O)_n-$, $-C_{2-12}O-(C_{2-4}\ O)_n-$, $-C_{2-12}O-(CO-C_{2-5}O)_n-$, or $-C_{2-12}O-(CO-C_{2-5}\ NH)_n-$ where n is a whole number from 1 to 10, including, for example, from 1 to 5; $R_2$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_2$. Similarly, the urethane group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis.

The curable secondary coating composition may also contain a polymerization initiator to facilitate polymerization (curing) after application of the curable secondary coating composition to the cladding. For many acrylate-based coating formulations, photoinitiators, such as the known ketonic photoinitiating and/or phosphine oxide additives, may be used. The amount of photoinitiator may be adjusted to promote radiation cure to provide reasonable cure speed without causing premature gelation of the curable secondary coating composition. A desirable cure speed may be a speed sufficient to cause curing of the coating composition of greater than about 90%, or greater than 95%). As measured in a dose versus modulus curve, a cure speed for coating thicknesses of about 75 μm may be, for example, less than 1.0 J/cm² or less than 0.5 J/cm².

Suitable photoinitiators for the curable secondary coating composition may include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxyl-2-phenyl acetophenone (e.g., Irgacure, 651, BASF); bis(2,4,6-trimethylbenzoyl)phenyl phosphine oxide (e.g., Irgacure 819, BASF); (2,4,6-triiethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to the above-described components, the curable secondary coating composition may optionally include an additive or a combination of additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation). Embodiments of additives include those described hereinabove for the primary coating composition.

The curable secondary coating composition may include thiodiethylene bis(3,5-di-tert-butyl)-4-hydroxyhydrocinnamate (e.g., Irganox 1035, available from BASF) as an antioxidant. The curable secondary coating composition may include an acrylated acid adhesion promoter (such as Ebecryl 170 (available from UCB Radcure (Smyrna Ga.)).

The Young's modulus of the secondary coating is reported herein for secondary coating compositions configured as cured rods according to the following description: Rods were prepared by injecting samples of the curable secondary composition into Teflon® tubing having an inner diameter of about 0.022". The samples were cured using a Fusion D bulb at a dose of about 2.4 J/cm² (measured over a wavelength range of 225-424 nm by a Light Bug model IL390 from International Light). After curing, the Teflon® tubing was stripped away. The cured rods were allowed to condition overnight at 23° C. and 50% relative humidity. After curing the rod diameter was about 0.022". Properties such as Young's modulus, tensile strength, and % elongation at break for the cured rods formed from the secondary composition were measured using a tensile testing instrument (e.g., a Sintech MTS Tensile Tester, or an Instron Universal Material Test System) on the cured secondary rod samples. The gauge length of the testing instrument was 51 mm, and the test speed was 250 mm/min. Properties were determined as an average of five samples, with outlying data points and obviously defective rod samples being excluded from the average.

The secondary coating with scattering centers has a Young's modulus, when configured as a cured rod having a diameter of about 0.022" of at least about 500 MPa, or at least about 700 MPa, or at least about 900 MPa, or at least about 1100 MPa. The cured polymeric material of secondary coating, when configured as a cured rod having a diameter of about 0.022", has an elongation to break of at least about 30%, preferably at least about 40%. The cured polymeric material of secondary coating, when configured as a cured rod having a diameter of about 0.022", has an average tensile strength of at least about 20 MPa, more preferably at least about 25 MPa, most preferably at least about 30 MPa. The $T_g$ of the secondary coating with scattering centers, when configured as a cured rod having a diameter of about 0.022", is preferably between about 50° C. and about 120° C., more preferably between about 50° C. and about 100° C.

The thickness of the secondary coating with scattering centers may be at least 1 µm, or at least 5 µm, or at least 10 µm, or at least 20 µm, or at least 40 µm, or at least 60 µm, or at least 80 µm, or in the range from 1-200 µm, or in the range from 5-150 µm, or in the range from 10 µm-125 µm.

The secondary coating with scattering centers may be the outermost coating of the fiber and the outer diameter of a fiber having a secondary coating with scattering centers may be in the range from 150 µm-300 µm, or in the range from 175 µm-275 µm, or in the range from 200 µm-265 µm, or in the range from 210 µm-260 µm, or in the range from 220 µm-255 µm, or in the range from 225 µm-250 µm.

In one embodiment, the scattering centers in the secondary coating are nanoparticles. Nanoparticles are particulate matter having dimensions in the nanoscale regime. The dimensions of the nanoparticles may be expressed in terms of a linear dimension, such as a cross-sectional dimension (e.g. length, diameter). The nanoparticles may include particles having a distribution of cross-sectional dimension. Unless otherwise specified herein, reference to a cross-sectional dimension refers to an average of the cross-sectional dimension for the nanoparticles contained in the secondary coating. The cross-sectional dimension and concentration of nanoparticles in the secondary coating are selected to promote a symmetric distribution of scattered light intensity. The cross-sectional dimension of the nanoparticles may be less than 1000 nm, or less than 800 nm, or at less than 600 nm, or less than 400 nm, or at least 10 nm, or at least 25 nm, or at least 50 nm or least 100 nm, or at least 150 nm, or at least 200 nm, or between 25 nm and 1000 nm, or between 25 nm and 750 nm, or between 50 nm and 500 nm, or between 50 nm and 300 nm, or between 50 nm and 200 nm, or between 75 nm and 300 nm, or between 75 nm and 250 nm, or between 100 nm and 200 nm. In one embodiment, the nanoparticles are approximately spherical and the cross-sectional dimension is the diameter of the sphere.

The concentration of nanoparticles in the uncured secondary coating composition used to form secondary coating may be greater than 0.5 wt %, or greater than 1 wt %, or greater than 1.25 wt %, or greater than 1.5 wt %, or greater than 2.0 wt %, or greater than 2.5 wt % or greater than 3.0 wt %, or greater than 3.5 wt %, or greater than 4.0 wt %, or between 0.5 wt % and 10 wt %, or between 1.0 wt % and 10 wt %, or between 1.25 wt % and 7.5 wt %, or between 1.25 wt % and 6.0 wt %, or between 1.5 wt % and 10 wt %, or between 1.5 wt % and 7.5 wt %, or between 1.5 wt % and 6.0 wt %, or between 2.0 wt % and 10 wt %, or between 2.0 wt % and 7.5 wt %, or between 2.0 wt % and 6.0 wt %.

The concentration of nanoparticles in the secondary coating may be greater than 0.5 wt %, or greater than 1 wt %, or greater than 1.25 wt %, or greater than 1.5 wt %, or greater than 2.0 wt %, or greater than 2.5 wt % or greater than 3.0 wt %, or greater than 3.5 wt %, or greater than 4.0 wt %, or between 0.5 wt % and 10 wt %, or between 1.25 wt % and 10 wt %, or between 1.0 wt % and 7.5 wt %, or between 1.25 wt % and 6.0 wt %, or between 1.5 wt % and 10 wt %, or between 1.5 wt % and 7.5 wt %, or between 1.5 wt % and 6.0 wt %, or between 2.0 wt % and 10 wt %, or between 2.0 wt % and 7.5 wt %, or between 2.0 wt % and 6.0 wt %.

In one embodiment, the nanoparticles are oxide nanoparticles. Representative compositions for oxide nanoparticles include $TiO_2$, $ZrO_2$, other transition metal oxides (e.g. MgO), rare earth oxides, mixed metal oxides (e.g. garnets such as $Y_3Al_5O_{12}$), $SiO_2$, hollow silica particles, $Al_2O_3$, and $BaSO_4$. In other embodiments, fluoride or chalcogenide nanoparticles may be used.

In certain embodiments, the nanoparticles are transparent to visible light. Visible light includes light in the wavelength range from 400 nm-700 nm. Transparency of the nanoparticles to visible light promotes illumination from the fiber using visible light sources. If the nanoparticles, for example, absorb visible light, the intensity of visible light emanating from the fiber is diminished and the intensity of illumination is reduced. The average transmittance of the nanoparticles (per mm thickness) over the wavelength range from 400 nm-700 nm may be greater than 75%, or greater than 80%, or greater than 85%, or greater than 90%, or greater than 95%.

In certain embodiments, the nanoparticles are luminescent (e.g. fluorescent or phosphorescent). Luminescent nanoparticles include oxides that include a light-emitting metal center. Light-emitting metal centers include $Cr^{3+}$, $Ce^{3+}$, $Nd^{3+}$, $Tb^{3+}$, $Eu^{3+}$, and $Pr^{3+}$. Light-emitting metal centers may be incorporated as dopants in otherwise non-luminescent inorganic host lattices (e.g. oxide lattices such as $Y_3Al_5O_{12}$ or $Al_2O_3$). Luminescent nanoparticles also include quantum dots or light-emitting semiconductor materials such as CdS, CdSe, ZnTe, ZnS, or other direct bandgap II-VI or III-V semiconductor materials. Use of light-emitting scattering centers permits control of the color of light emanating from the light-diffusing element. The light-emitting scattering centers absorb at least a portion of the light scattered from the core and reemit the light at a different wavelength to modify the color of the light released from the light-diffusing fiber. Light-emitting nanoparticles that emit at multiple wavelengths may be incorporated to provide greater control over color to achieve any color, or combinations of colors, in the spectrum (including white light). Inclusion of light-emitting scattering centers in the secondary coating may avoid the need to apply a separate phosphor coating layer over the light-diffusing element.

Nanoparticles may be incorporated in the secondary coating composition by adding nanoparticles (directly as a solid, in the form of a suspension, or in a solvent) to the secondary coating composition before applying the secondary coating composition to the primary composition during fabrication of the light-diffusing fiber. As the curing reaction proceeds and the secondary coating forms, the nanoparticles become incorporated in the secondary coating. In one embodiment, the nanoparticles are incorporated as a dispersed phase in the secondary coating.

Inclusion of scattering centers in the secondary coating obviates the need for a separate outer surface ink layer on the light-diffusing fiber and thus simplifies the process of manufacturing the light-diffusing fiber. The secondary coating with scattering centers provides the protective function of a conventional secondary coating and the scattering properties of the ink in a single layer of the light-diffusing fiber. The secondary coating may thus be the outermost coating of the light-diffusing fiber. As is known in the art, ink layers are commonly applied to the outermost surface of light-diffusing fibers to control or modify the angular distribution of light scattered from the light-diffusing element. The ink layer may be utilized to enhance the distribution and/or the nature of the scattered light. The ink layer may make the angular distribution of light scattered from the light-diffusing element more uniform by compensating for directional bias (e.g. forward scattering vs. backward scattering) in the scattering of light from the core region to provide greater angular uniformity in the scattering of light. Angle independence in the distribution of light scattered from the light-diffusing fiber promotes a more uniform intensity distribution in the angular direction. The presence of scattering centers in the secondary coating inherently provides the benefits of a surface ink layer.

The secondary coating with scattering centers improves the symmetry of the distribution of scattered light intensity relative to light-diffusing fibers known in the prior art. Symmetry in the distribution of scattered light intensity improves the aesthetic appearance of the illuminating effect provided by the light-diffusing fiber. Symmetry in the distribution of scattered light intensity may be assessed by the similarity of scattered light intensity at an azimuthal angle θ and its supplement (180°-θ). The greater the similarity is, the more symmetric is the distribution. Similarity in scattered light intensity may be expressed in terms of a ratio of scattered light intensity at azimuthal angle θ and scattered light intensity at the supplement of azimuthal angle θ, where the supplement of azimuthal angle θ is defined as 180°-θ. Symmetric distributions of scattered light intensity are characterized by ratios as close to 1.0 as possible at one or more azimuthal angles θ or over a range of azimuthal angles θ.

Inclusion of scattering centers in the secondary coating provides light-diffusing fibers having a ratio of scattered light intensity at azimuthal angle θ to scattered light intensity at the supplement of azimuthal angle θ in the range from 0.5-1.5, or in the range from 0.6-1.4, or in the range from 0.7-1.3, or in the range from 0.8-1.2, or in the range from 0.9-1.1, or in the range from 0.95 and 1.05 for one or more azimuthal angles θ, for a plurality of azimuthal angles θ, for one or more azimuthal angles θ within a range of azimuthal angles θ, for a plurality of azimuthal angles θ within a range of azimuthal angles θ, or at each angle within a range of azimuthal angles θ. The one or more azimuthal angles θ may be angles between 0° and 90°, such as angles of 15°, or 30°, or 45°, or 60°, or 75°. The range of azimuthal angles may extend over the range from 5°-90°, or over the range from 10°-90°, or over the range from 15°-90°, or over the range from 20°-90°, or over the range from 15°-75°, or over the range from 30°-60°.

The symmetry of the scattered light intensity may also be characterized by the azimuthal angle corresponding to the maximum scattered light intensity from the light-diffusing fiber. The azimuthal angle at which the scattered light intensity is a maximum may be referred to herein as the peak azimuthal angle. The peak azimuthal angle may occur at an angle of 90°, or an angle in the range from 85°-95°, or an angle in the range from 80°-100°, or an angle in the range from 75°-105°.

The ratio of scattered light intensity at azimuthal angle θ and its supplement and/or the azimuthal angle θ corresponding to peak scattering intensity as disclosed herein may be provided by the present light-diffusing fiber over one or more wavelengths of scattered light, or over two or more wavelengths of scattered light, or over three or more wavelengths of scattered light, or over four or more wavelengths of scattered light, or over a range of wavelengths of scattered light. The one or more wavelengths may include visible wavelengths, or ultraviolet wavelengths, or infrared wavelengths. The one or more wavelengths may include one or more wavelengths in the range from 350 nm-750 nm, or in the range from 400 nm-700 nm, or in the range from 420 nm-2000 nm, or in the range from 445 nm-1600 nm, or in the range from 520 nm-1500 nm, or in the range from 630 nm-1000 nm. The one or more wavelengths may include each wavelength in the range from 350 nm-750 nm, or in the range from 400 nm-700 nm, or in the range from 420 nm-2000 nm, or in the range from 445 nm-1600 nm, or in the range from 520 nm-1500 nm, or in the range from 630 nm-1000 nm. The one or more wavelengths are supplied by a light source coupled to the light-diffusing fiber. Light sources include lamps, LEDs and lasers that operate at selected wavelengths or over a broad range of wavelengths. For aesthetic illumination, the light source provides visible wavelengths and the scattered wavelengths include visible wavelengths.

EXAMPLES

The scattered light intensity profile of seven illustrative light-diffusing fibers is considered in the following Examples. The seven fibers will be designated as Samples 1-7. All light-diffusing fibers considered in the Examples described herein (Samples 1-7) included a core, a polymer cladding, and a secondary coating, where the polymer cladding was in direct contact with the core and the secondary coating was in direct contact with the polymer cladding. As described more fully below, the secondary coating of all light-diffusing fibers in the Examples described herein (Samples 1-7) included at least a portion that lacked scattering centers. The secondary coating of some light-diffusing fibers considered in the Examples described herein further included a portion having scattering centers in addition to the portion lacking scattering centers (Samples 3-7). One light-diffusing fiber in the Examples described herein included only a secondary coating without scattering centers (Sample 1). Another light-diffusing fiber in the Examples described herein included a secondary coating without scatter centers and an overlying ink layer (Sample 2).

Each of Samples 1-7 included at least the following attributes and Sample 1 included only the following attributes: The core consisted of undoped silica glass with voids and had a diameter of 170 μm. The voids were distributed throughout the core. The polymer cladding was in direct contact with the core and consisted of a fluorinated acrylate polymer obtained by curing a proprietary curable composition supplied by Raymat Materials, Inc. (Pleasanton, Calif.) (Product No. RMAT137). The polymer cladding had a thickness of 10 μm (outer diameter of 190 μm). The secondary coating was in direct contact with the polymer cladding and was formed by curing a proprietary coating composition (Product No. 2-037) available from Momentive Performance Materials, Inc. (Waterford, N.Y.). The portion of the secondary coating without scattering centers had a thickness of 15 μm (outer diameter of 220 μm).

Sample 2 included the features of Sample 1 and further included an ink layer in direct contact with the secondary coating. The ink layer was prepared by applying and curing a curable ink composition to the secondary coating. The curable ink composition included curable acrylate monomers and a white ink dispersion. The white ink dispersion included 75 wt % $TiO_2$ in propoxylated neopentyl glycol diacrylate (available from Penn Color, Inc. (Doylestown, Pa.), Product No. 9W892). Incorporation of the white ink dispersion in the curable ink composition dilutes the concentration of $TiO_2$ to 5 wt %. According to a specification sheet provided by the manufacturer, the particle size distribution of $TiO_2$ in the white ink dispersion can be described by a distribution curve having a peak diameter of 274.7 nm and a width of 120 nm. The thickness of the ink layer was 5 μm (outer diameter of 230 μm).

Samples 3-7 included the features of Sample 1 as well as an additional portion of the secondary coating that included scattering centers. The additional portion of secondary coating with scattering centers was applied as an overlayer to the portion of the secondary coating without scattering centers. The additional portion of secondary coating with scattering centers had a thickness of about 45 μm (outer diameter of 310 μm) and was in direct contact with the portion of secondary coating without scattering centers. The portion of secondary coating with scattering centers was obtained by adding the white ink dispersion described for Sample 2 to the secondary coating composition, applying the dispersion-containing composition to the portion of secondary coating without scattering centers, and curing. Different concentrations of the white ink dispersion were included for Samples 3-7. Concentrations are summarized below:

| Sample | TiO$_2$ Dispersion (wt %) | TiO$_2$ (wt %) |
|---|---|---|
| 3 | 0.66 | 0.5 |
| 4 | 1.33 | 1.0 |
| 5 | 2.0 | 1.5 |
| 6 | 4.0 | 3.0 |
| 7 | 6.66 | 5.0 | where the column "TiO$_2$ Dispersion (wt %)" lists the concentration (in wt %) of ink dispersion included in the secondary coating composition used to form the portion of secondary composition with scattering centers and the column "TiO$_2$ (wt %)" lists the concentration of TiO$_2$ included in the secondary coating composition used to form the portion of secondary composition with scattering centers.

Scattering intensity profiles were measured for Samples 1-7. The scattering intensity profile corresponds to the intensity of scattered light as a function of azimuthal angle and was measured by the technique described in Mazumder et al., "Analysis of Excess Scattering in Optical Fibers", Journal of Applied Physics, Vol. 96, 4042-4049 (2004). The technique is briefly described as follows: The measurement system used to obtain the angular distribution of scattering consisted of a system for measuring the wide-angle component and a system for measuring the small-angle component. The wide-angle system included a half cylinder of high purity fused silica that was polished on all sides to minimize surface roughness. The flat part of the half cylinder was painted black except for a small aperture at the center. The fiber sample was placed in a groove of a black steel plate and was covered by the flat surface of the half cylinder. An index matching gel was used to eliminate any air gap present between the half cylinder and fiber sample. Light was transmitted through the fiber sample and the angular distribution of scattering was measured by an InGaAs detector that was moved in a semicircular motion about the curved surface of the half cylinder. The wide-angle system was suitable for measuring scattering intensity at azimuthal angles ranging from ~20°~160°. In the small-angle system, the fiber sample was placed between two high purity fused silica roof prisms with base angles of 45°, 90°, and 135°. The length and height of the prisms was 10 cm and 5 cm, respectively. A planoconvex high purity fused silica lens was positioned on top of the upper prism. Air gaps between the prisms, the optical fiber, and lens were eliminated with an index-matching gel. The 45° surface of the bottom prism was coated with silver to render it reflective. A detector placed at the focal plane of the lens was scanned along the fiber. Different angles were focused onto different locations of the focal plane. Light was passed through the fiber sample and the detector recorded the scattered intensity as a function of distance from the center of the lens. The raw data were converted into scattering intensity as a function of scattering angle using geometric mapping techniques known in the art. The small-angle system was suitable for measuring scattering intensity at azimuthal angles ranging from ~0°-~30° and ~150°-~180°.

Figure 3:
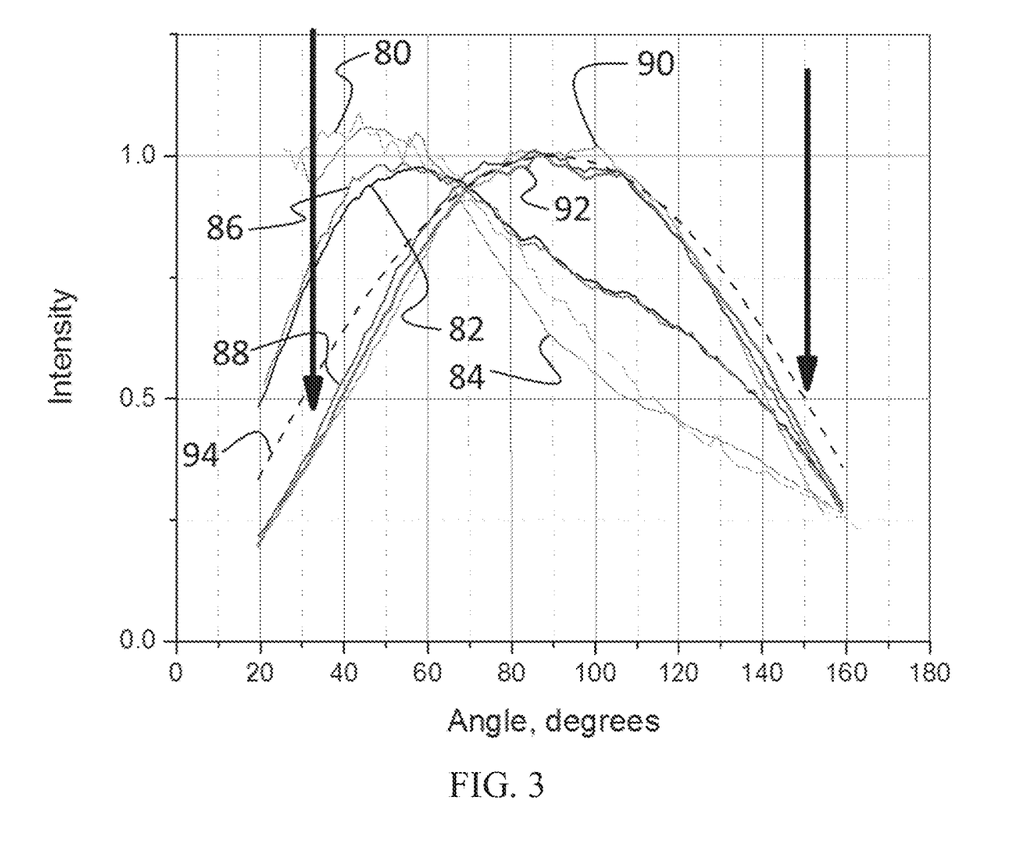
FIG. 3 shows the intensity of scattered light as a function of azimuthal angle for several light-diffusing fibers.

FIG. 3 shows the scattering intensity profiles for light-diffusing fiber Samples 1-7. Trace 80 shows the profile for Sample 1, which is a light-diffusing fiber without scattering centers in the secondary coating. The distribution of scattered light intensity observed for Sample 1 is highly skewed in the forward direction (azimuthal angles <90°) and highly asymmetric. Trace 82 shows the profile for Sample 2, which is a light-diffusing fiber with a secondary coating without scattering centers and an outer TiO$_2$ white ink layer. The profile for Sample 2 exhibits more scattering in the backward direction (azimuthal angles >90°) and is more symmetric than the profile for Sample 1, but remains skewed in the forward direction.

Samples 3-7 have secondary coatings that include an inner portion without scattering centers and an outer portion with TiO$_2$ scattering centers, as described above, where the concentration of TiO$_2$ scattering centers differs in Samples 3-7. Traces 84, 86, 88, 90, and 92 show the scattering intensity profiles for Samples 3-7, respectively. The data show that the scattering intensity profile becomes more symmetric as the concentration of TiO$_2$ particles in the outer portion of the secondary coating increases. When the concentration of TiO$_2$ particles is 0.5 wt % (Sample 3 (Trace 84)), the profile remains asymmetric and skewed in the forward scattering direction. When the concentration of TiO$_2$ particles is 1.0 wt % (Sample 4 (Trace 86)), the profile was similar to the one observed for Sample 2 (Trace 82). When the concentration of TiO$_2$ particles is 1.5 wt % or above (Traces 88 (Sample 5), 90 (Sample 6), and 92 (Sample 7)), the scattering profile became highly symmetric with a peak scattering intensity occurring at an azimuthal angle near 90°. Trace 94 is a calculated curve that shows a scattered intensity profile fit to a cosine function. A cosine dependence of scattering intensity corresponds to a Lambertian distribution of scattering intensity. The scattering intensity profiles for Samples 5, 6, and 7 closely approximate the cosine distribution.

Figure 4:
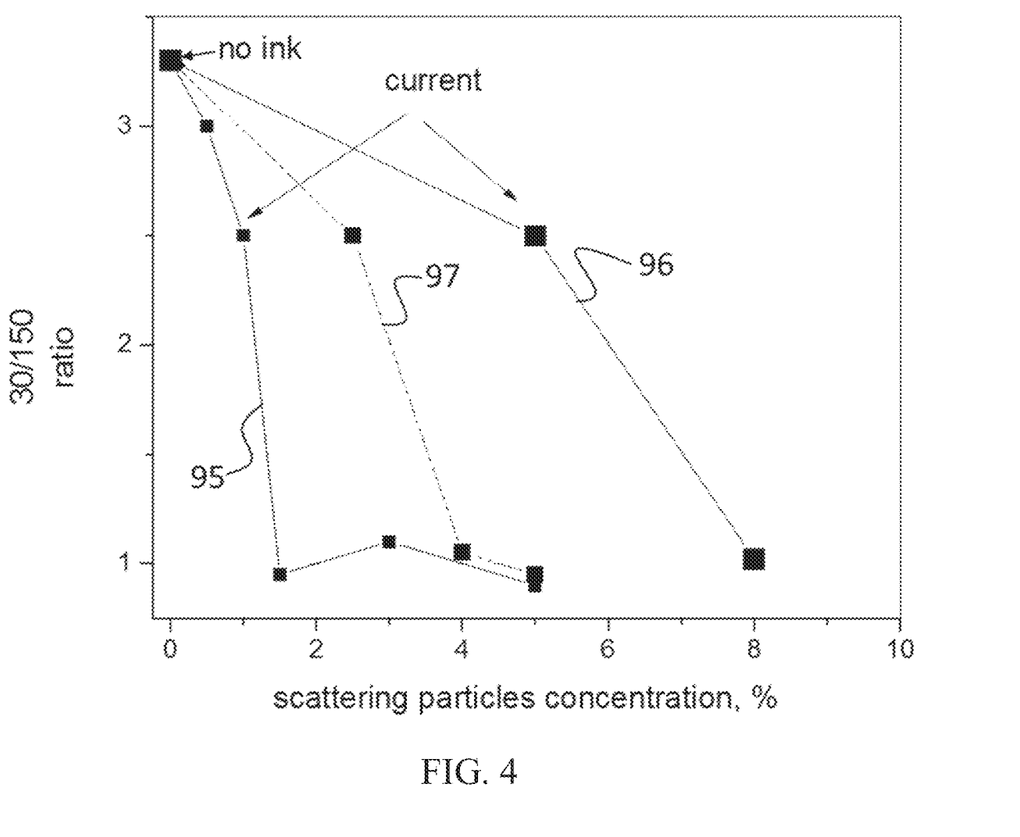
FIG. 4 shows the variation of in the ratio of scattered light intensity at azimuthal angles of 30° and 150° for light-diffusing fibers having secondary coatings that vary in thickness and concentration of scattering centers.

FIG. 4 presents one measure of the symmetry of the scattered intensity profile for several light-diffusing fibers having a silica glass core with voids (outer diameter of 170 μm), a fluoroacrylate polymer cladding (variable thickness), and a secondary coating (variable thickness and variable concentration of TiO$_2$ scattering centers (average diameter of 100-300 nm)). FIG. 4 shows the ratio of scattered intensity at an azimuthal angle of 30° to scattered intensity at an azimuthal angle of 150° (the supplement of azimuthal angle 30°) as a function of the concentration of TiO$_2$ scattering centers in the secondary coating. A ratio of 1 signifies parity of scattered intensity at the two angles and is consistent with a symmetric profile. Traces 95 and 96 are measured and Trace 97 is estimated. The data points labeled "no ink" refer to light-diffusing fibers with a 10 μm thick polymer cladding (outer diameter of 190 μm) and a 15 μm thick secondary coating without scattering centers (outer diameter of 220 μm). The data points labeled "current" refer to light-diffusing fibers in the prior art. The data point labeled "current" having a TiO$_2$ concentration of 1 wt % in the secondary coating had a polymer cladding of thickness 20 μm (outer diameter of 210 μm) and a secondary coating thickness of 25 nm (outer diameter of 260 nm). The data point labeled "current" having a TiO$_2$ concentration of 5 wt % in the secondary coating had a polymer cladding of thickness 40 µm (outer diameter of 250 nm) and a secondary coating thickness of 5 nm (outer diameter of 260 nm). The two data points labeled "current" demonstrate that a similar ratio of scattered intensity can be achieved for secondary coatings of various thicknesses by varying the concentration of scattering centers. Thinner secondary coatings with higher concentrations of scattering centers perform comparably to thicker secondary coatings with lower concentrations of scattering centers.

Trace 95 shows the scattering intensity ratio as a function of concentration of $TiO_2$ scattering centers in a light-diffusing fiber with a polymer cladding having a thickness of 25 µm (outer diameter of 220 µm) and a secondary coating with scattering centers having a thickness of 45 µm. Trace 96 shows the scattering intensity ratio as a function of concentration of $TiO_2$ scattering centers in a light-diffusing fiber with a polymer cladding having a thickness of 40 µm (outer diameter of 250 µm) with a secondary coating with scattering centers having a thickness of 5 µm (outer diameter of 260 µm). Trace 97 shows the estimated scattering intensity ratio as a function of concentration of $TiO_2$ scattering centers in a light-diffusing fiber with a polymer cladding having a thickness of 10 µm (outer diameter of 190 µm) and a secondary coating with scattering centers having a thickness of 15 µm (outer diameter of 220 µm).

The results shown in FIG. 4 indicate that the scattered intensity profile becomes more symmetric as either the thickness of the secondary coating increases or the concentration of scattering centers increases. The high ratio observed when scattering centers are absent from the secondary coating is indicative of a highly asymmetric scattered intensity profile that exhibits a strong bias toward forward scattering relative to backward scattering. The concentration of $TiO_2$ scattering centers needed to make the scattered intensity profile more symmetric (by providing a ratio close to 1) depends on the thickness of the secondary coating. When the thickness of the secondary coating is 25 µm, a $TiO_2$ concentration of 1.5 wt % provides a ratio of approximately 1. $TiO_2$ concentrations of about 4 wt % and 8 wt % are needed to achieve ratios close to 1 for secondary coating thicknesses of 15 µm and 5 µm, respectively. The present light-diffusing fibers provide a significant improvement in the symmetry of scattered light intensity relative to light-diffusing fibers known in the prior art.

Thickness or concentration of scattering centers in the secondary coating can be varied to improve the symmetry of the scattered intensity profile. The results indicate that for given concentration of scattering centers, thicker secondary coatings provide more symmetric scattered intensity profiles. Conversely, for a given thickness of secondary coating, higher concentrations of scattering centers provide more symmetric scattered intensity profiles.

The present light-diffusing fibers may include a secondary coating having concentration of scattering centers of at least 0.5 wt %, or at least 1.0 wt %, or at least 1.5 wt %, or at least 2.0 wt %, or between 0.2 wt % and 5.0 wt %, or between 0.3 wt % and 4.0 wt %, or between 0.4 wt % and 3.5 wt %, or between 0.5 wt % and 3.0 wt %, or between 0.6 wt % and 2.5 wt %, or between 0.7 wt % and 2.0 wt %.

The present light-diffusing fibers may include a secondary coating have a thickness of at least 5 µm and a concentration of scattering centers at least 6 wt %, or a thickness of at least 10 µm and a concentration of scattering centers at least 5 wt %, or a thickness of at least 15 µm and a concentration of scattering centers at least 3 wt %, or a thickness of at least 30 µm and a concentration of scattering centers at least 2 wt %, or a thickness of at least 45 µm and a concentration of scattering centers at least 1.5 wt %.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A light-diffusing optical fiber comprising:
a glass core, said glass core comprising a volume fraction of voids of between 0.5% and 20%; and
a cladding surrounding said glass core;
a primary coating surrounding the cladding, wherein the primary coating has a Young's modulus, when configured as a cured film with 80 µm thickness, of less than 1.5 MPa and wherein the primary coating is the cured product of a primary composition that includes a curable crosslinker, a curable diluent, and a polymerization initiator, the curable crosslinker being essentially free of urethane and urea functional groups; and
a secondary coating surrounding said primary coating, wherein said secondary coating has a Young's modulus, when configured as a cured rod having a diameter of 0.022", of at least 500 MPa;
wherein said secondary coating comprises an inner portion without scattering centers and an outer portion with scattering centers, said scattering centers having a concentration of at least 0.5 wt % in said outer portion of the secondary coating;
wherein said light-diffusing optical fiber is configured to scatter light propagating in said glass core; and
wherein a maximum intensity of scattered light occurs at a peak azimuthal angle, said peak azimuthal angle being in the range from 80°-100°.

2. The light-diffusing optical fiber of claim 1, wherein said glass core has a cross-sectional dimension greater than 50 µm.

3. The light-diffusing optical fiber of claim 1, wherein said cladding comprises a polymer.

4. The light-diffusing optical fiber of claim 1, wherein said cladding has a thickness of at least 10 µm.

5. The light-diffusing optical fiber of claim 1, wherein said core has a first refractive index and said cladding has a second refractive index, said second refractive index being at least 0.003 less than said first refractive index.

6. The light-diffusing optical fiber of claim 1, wherein said scattering centers include nanoparticles, said nanoparticles having a cross-sectional dimension of at least 25 nm.

7. The light-diffusing optical fiber of claim 1, wherein said secondary coating is the outermost coating.

8. An illumination system comprising the light-diffusing optical fiber of claim 1 and a light source, said light-diffusing optical fiber having a first end and a second end, said light source being coupled to said first end.

9. The light-diffusing optical fiber of claim 1, wherein the primary composition comprises from 1 wt % to 20 wt % of the curable crosslinker, from 10 wt % to 60 wt % of the curable diluent, and from 0.5 wt % to 10.0 wt % of the polymerization initiator.

10. The light diffusing optical fiber of claim 1, wherein the primary coating has a thickness in the range of from 5 μm to 50 μm.

11. The light-diffusing optical fiber of claim 6, wherein said nanoparticles have an average transmittance, per mm thickness, over the wavelength range from 400 nm-700 nm of greater than 90%.

12. The light-diffusing optical fiber of claim 6, wherein said secondary coating comprises a polymer.

13. The light diffusing optical fiber of claim 9, wherein the curable crosslinker has a molecular weight of from 150 g/mol to 15000 g/mol.

14. The light diffusing optical fiber of claim 13, wherein the curable diluent has a molecular weight of from 120 g/mol to 600 g/mol.

15. A light-diffusing optical fiber comprising:
   a glass core, said glass core comprising a volume fraction of voids of between 0.5% and 20%; and
   a cladding surrounding said glass core;
   a primary coating surrounding the cladding, wherein the primary coating has a Young's modulus, when configured as a cured film with 80 μm thickness, of less than 1.5 MPa and wherein the primary coating is the cured product of a primary composition that includes a curable crosslinker, a curable diluent, and a polymerization initiator, the curable crosslinker being essentially free of urethane and urea functional groups; and
   a secondary coating surrounding said primary coating, said secondary coating comprising an inner portion without scattering centers and an outer portion with scattering centers;
   wherein said light-diffusing optical fiber is configured to scatter light propagating in said glass core in a first azimuthal direction having an azimuthal angle $\theta_1$ and in a second azimuthal direction having an azimuthal angle $180°-\theta_1$;
   wherein the ratio of the intensity of light scattered in said first azimuthal direction to the intensity of light scattered in said second azimuthal direction is in the range from 0.5-1.5; and
   wherein the maximum intensity of scatter light occurs at a peak azimuthal angle, said peak azimuthal angle being in the range from 80°-100°.

16. The light-diffusing fiber of claim 15, wherein said scattering centers include nanoparticles.

17. The light-diffusing optical fiber of claim 15, wherein said azimuthal angle $\theta_1$ is an angle in the range from 5°-90°.

18. An illumination system comprising the light-diffusing optical fiber of claim 15 and a light source, said light-diffusing optical fiber having a first end and a second end, said light source being coupled to said first end.

19. A light-diffusing optical fiber comprising:
   a glass core, said glass core comprising a volume fraction of voids of between 0.5% and 20%; and
   a cladding surrounding said glass core;
   a primary coating surrounding the cladding, wherein the primary coating has a Young's modulus, when configured as a cured film with 80 μm thickness, of less than 1.5 MPa and wherein the primary coating is the cured product of a primary composition that includes a curable crosslinker, a curable diluent, and a polymerization initiator, the curable crosslinker being essentially free of urethane and urea functional groups; and
   a secondary coating surrounding said primary coating, said secondary coating comprising an inner portion without scattering centers and an outer portion with scattering centers;
   wherein said light-diffusing optical fiber is configured to scatter light propagating in said glass core in a first plurality of azimuthal directions spanning a first plurality of azimuthal angles and in a second plurality of azimuthal directions spanning a second plurality of azimuthal angles, said second plurality of azimuthal angles corresponding to supplements of said first plurality of azimuthal angles;
   wherein the ratio of the intensity of light scattered in two or more of said first plurality of azimuthal directions to the intensity of light scattered in two or more of said second plurality of azimuthal directions is in the range from 0.5-1.5, said two or more of said first plurality of azimuthal directions corresponding to two or more of said first plurality of azimuthal angles and said two or more of said second plurality of azimuthal directions having azimuthal angles corresponding to supplements of said two or more of said first plurality of azimuthal angles; and
   wherein the maximum intensity of scatter light occurs at a peak azimuthal angle, said peak azimuthal angle being in the range from 80°-100°.

20. An illumination system comprising the light-diffusing optical fiber of claim 19 and a light source, said light-diffusing optical fiber having a first end and a second end, said light source being coupled to said first end.

* * * * *